2,913,368

BACTERIOSTAT

Gail H. Birum, Dayton, Ohio, assignor to Monsanto Chemical Company, St. Louis, Mo., a corporation of Delaware No Drawing. Application August 22, 1957
Serial No. 679,783

6 Claims. (Cl. 167—22)

The present invention relates to bacteriostatic compositions.

According to the invention the growth of bacteria is inhibited by exposing said bacteria to a toxic quantity of an organic sulfenate having the formula $$RO\text{—}S\text{—}CCl_3$$

in which R is selected from the class consisting of hydrocarbon radicals of from 1 to 18 carbon atoms and said hydrocarbon radicals having at least one substituent selected from the class consisting of halogen, nitro and alkoxy.

The presently useful compounds may be generally described as esters of trichloromethanesulfenic acid. They are prepared in known manner by condensation of perchloromethylmercaptan with the appropriate alcohol or phenol or an alkali metal alcoholate or phenylate thereof. One class of such esters includes the hydrocarbon esters of trichloromethanesulfenate wherein there are present from 1 to 18 carbon atoms in said hydrocarbon radical, e.g., the alkyl trichloromethanesulfenates, such as the methyl, isoprophyl, n-amyl, 2-ethylhexyl, tert-dodecyl or n-hexadecyl ester; the alkenyl trichloromethanesulfenates such as the allyl, 2-butenyl or 1-dodecenyl ester; the alkinyl trichloromethanesulfenates such as the propargyl ester; the cycloalkyl trichloromethanesulfenates, such as the cyclohexyl, the cyclopropyl or 2-methylcylclohexyl ester; and aryl, aralkyl or alkaryl trichloromethanesulfenates such as the phenyl, biphenylyl, α-naphthyl, benzyl, 3,4,-dimethylphenyl, 3-phenylpropyl, 2-o-tolylethyl, 4-ethylphenyl, 2,3-dimethylbenzyl, or 2-n-dodecylphenyl esters.

As herein stated, the alcoholic or phenolic portion of the present esters may carry at least one halogen and/or alkoxy substituent and/or nitro radical. One class of such presently useful substituted esters are the halogen substituted hydrocarbon esters of trichloromethanesulfenic acid such as the bromo-, chloro-, iodo- or fluoro-substituted alkyl esters, e.g., the 2,3-dichloropropyl, the 2-fluoroethyl, the 2-chloroethyl or the polychlorinated dodecyl trichloromethanesulfenates; the halo-substituted unsaturated aliphatic esters such as the 3-chloroisopropenyl or the 3-bromoallyl trichloromethanesulfenates; the halo-substituted aryl esters such as the 2-, 3-, or 4-chlorophenyl, the 2,3-dibromophenyl, the 3,4-diiodophenyl, the 4-fluorophenyl, and the pentachlorophenyl trichloromethanesulfenates; the halo-substituted aralkyl esters such as the 2,3-dichlorobenzyl or the 2-(4-bromophenyl)ethyl trichloromethanesulfenate; the halo-substituted alkaryl esters such as the 2-chloro-4-tolyl, the 3,4-dimethyltrichlorophenyl, the 4-tert-butyltetrachloro or the 4-benzyl-2-chlorophenyl trichloromethanesulfenates.

Another class of the presently substituted esters are those carrying the nitro radical as a substituent, e.g., the 2-, 3-, or 4-nitrophenyl or the 2,4-dinitrophenyl trichloromethanesulfenate, the 2-chloro-4-nitrobenzyl or the 2-(4-nitrophenyl)-ethyl trichloromethanesulfenate, the 2-methyl-2-nitropropyl or the 2-nitro-2-phenylpropyl trichloromethanesulfenate, etc.

Another class of the presently substituted esters are those carrying an alkoxy radical as a substituent, e.g., the 4-anisyl, the 3-veratryl, the 2,3-dimethoxybenzyl, the 2-n-butoxy-4-methyl, the 2-ethoxyethyl or the 3-methoxyallyl trichloromethanesulfenate.

Examples of presently useful esters having both halogen and alkoxy substitutents are the 2-chloro-4-ethoxyphenyl, the 2,4-dichloro-3-methoxybenzyl, the 4-chloro-2-anisyl, the 3,4-dibromo-2-veratryl, the 4-chloro-3-ethoxybutyl, or 4,4'-dichloro-2,2'-dimethoxbiphenylyl trichloromethanesulfenates.

The alcoholic portion of the presently useful trichloromethanesulfenates is advantageously derived from industrially available alcohols or mixtures of alcohols obtainable by hydrogenation of the higher fatty acids, e.g., technical lauryl alcohol, or by the reaction of carbon monoxide and hydrogen with olefins according to the "Oxo" process, e.g., the tridecyl alcohol obtained from butylene trimer or propylene tetramer.

The present bacteriostat compositions are characterized by a high degree of efficacy in that even in very low concentrations, e.g., in concentrations of from 1 part by weight of the sulfenate per from one thousand to a million parts by weight of an inert carrier, they completely inhibit bacterial growth. Bacteriostatic compositions comprising the present sulfenates are prepared by incorporating them into an inert carrier, which carrier may be a liquid or a powdered or granulated solid. The liquid compositions may be prepared by simply dissolving the sulfenate in an organic solvent therefor, but they are most advantageously formulated by dispersing them in water with the aid of a dispersing agent or by preparing oil-in-water emulsions therefrom. Dispersing or emulsifying agents employed are ionic or non-ionic surfactants such as the long-chained polyalkylene gylcols, the long-chained alkyl sulfosuccinates or the long-chained N-alkyl polyalkylenepolyamines. In preparing the aqueous dispersions, the sulfenate is simply added to water and agitated in the presence of the dispersing agent, which agent is present in the water in a concentration of, say, from 0.0001 percent to 1.0 percent by weight based on the total weight of the water and the sulfenate. The oil-in-water emulsions are most conveniently formulated by first preparing an organic solution of the sulfenate and then adding the solution to water containing the dispersing or emulsifying agent. Concentrated emulsions containing say, from 25 percent to 50 percent of the sulfenate may thus be prepared and dispensed for formulation by the consumer into dilute aqueous compositions containing the very small amounts of active ingredient, i.e., the sulfenate. The diluted aqueous oil-in-water emulsions may be used directly as a sterilizing medium or as a bacterial growth-retarding composition. The present sulfenates are present in the diluted emulsions in concentrations of the order of 0.1 g. per 100 cc. of emulsion; however, in many instances, depending upon the nature of the individual sulfenate and that of the microorganism against which it is used, emulsions containing as little as 0.0001 g. per 100 cc. of water have been found to be useful.

Dusts or powders with which the present sulfenates are formulated to give bacteriostatic compounds include talc, finely powdered pumice or chalk, etc. Bacteriostatic compositions comprising the present sulfenates may also be prepared by incorporating them into readily volatilizable organic solvents in effective proportions and preparing aerosol bombs from such solutions. The difluorodichloromethanes and other "Freon" type materials are useful in such formulations.

The invention is further illustrated, but not limited, by the following example.

Example 1

A number of trichloromethanesulfenates were tested for bacteriostatic activity as follows:

Each of the test compounds was dissolved in a non-toxic solvent to give respective 1% stock solutions. The stock solutions were then added to the nutrient agar to give respective test samples containing 1 part of the test compound per one thousand parts of the agar, per 10 thousand parts of the agar or per 100,000 parts of the agar. Petri dishes were respectively filled with each of the test samples, and the plates thus prepared were then inoculated with *Micrococcus pyogenes* var. *aureus* and with *Salmonella typhosa*, spot inoculations of each organism being made on opposite sides of the same Petri dish. The inoculated dishes were incubated for 2 days at a temperature of 37° C. At the end of that time inspection of the plates showed that for the following test compounds the 1/1000 test plate represented the lowest concentration at which the growth of said *S. typhosa* was completely inhibited:

4-chlorophenyl trichloromethanesulfenate
2-chlorophenyl trichloromethanesulfenate
Phenyl trichloromethanesulfenate
2-methoxyphenyl trichloromethanesulfenate
Ethyl trichloromethanesulfenate
2-benzyl-4-chlorophenyl trichloromethanesulfenate The 1/1000 test plates demonstrated the lowest concentration for complete inhibition of said *M. pyogenes* var. *aureus* by the following:

2-chlorophenyl trichloromethanesulfenate
2-methoxyphenyl trichloromethanesulfenate The lowest completely inhibiting concentration against said *S. typhosa* was found to be 1/10,000 for the following:

Allyl trichloromethanesulfenate
2,4-dichlorophenyl trichloromethanesulfenate
2-chloro-4-nitrophenyl trichloromethanesulfenate The lowest effective concentration for complete inhibition of said *M. pyogenes* var. *aureus* was 1/10,000 for:

Allyl trichloromethanesulfenate
Phenyl trichloromethanesulfenate
2,4-dichlorophenyl trichloromethanesulfenate
2-benzyl-4-chlorophenyl trichloromethanesulfenate Said *S. typhosa* was completely inhibited at the 1/100,000 concentration by 2,4,5-trichlorophenyl trichloromethanesulfenate and at this concentration this compound as well as 4-chlorophenyl trichloromethanesulfenate and 2-chloro-4-nitrophenyl trichloromethanesulfenate completely inhibited said *M. pyogenes* var. *aureus*.

Example 2

A 1.0% acetone solution of 2-benzyl-4-chlorophenyl trichloromethanesulfenate was added to sterile melted nutrient agar to give an 0.0001% (1 p.p.m.) concentration of said sulfenate in the agar. The resulting agar was poured into Petri dishes and allowed to harden. Plates thus prepared were respectively inoculated with one of the following organisms:

(1) *Streptococcus faecalis* ATCC 1790
(2) *Cornyebacterium diphtheriae* ATCC 296
(3) *Bacterium ammoniagenes* ATCC 6871
(4) *Bacillus subtilis* (Lambert)

The thus inoculated plates, as well as similarly inoculated plates of agar which contained no test chemical, i.e., "controls" were incubated for 48 hours at 25° C. Inspection of the inoculated plates at the end of that time showed no bacterial growth on those plates of agar which contained the 1 p.p.m. concentration of 2-benzyl-4-chlorophenyl trichloromethanesulfenate, whereas profuse growth was evidenced on the "controls."

This invention is a continuation-in-part of my copending application Serial No. 470,786, filed November 23, 1954, now abandoned.

What I claim is:

1. The method of inhibiting the growth of bacteria which comprises exposing said bacteria to a compound of the formula $$RO-S-CCl_3$$

in which R is selected from the class consisting of alkyl, alkenyl, aryl and arylalkyl radicals of from 1 to 18 carbon atoms and said hydrocarbon radicals having at least one substituent selected from the class consisting of halogen, nitro and alkoxy, radicals of from 1 to 4 carbon atoms, said compound being used in a quantity which is toxic to the bacteria.

2. The method of inhibiting the growth of bacteria which comprises exposing said bacteria to 2,4,5-trichlorophenyl trichloromethanesulfenate, in a quantity which is toxic to the bacteria.

3. The method of inhibiting the growth of bacteria which comprises exposing said bacteria to 2-chloro-4-nitrophenyl trichloromethanesulfenate, in a quantity which is toxic to the bacteria.

4. The method of inhibiting the growth of bacteria which comprises exposing said bacteria to 2,4-dichlorophenyl trichloromethanesulfenate, in a quantity which is toxic to the bacteria.

5. The method of inhibiting the growth of bacteria which comprises exposing said bacteria to allyl trichloromethanesulfenate, in a quantity which is toxic to the bacteria.

6. The method of inhibiting the growth of bacteria which comprises exposing said bacteria to 2-benzyl-4-chlorophenyl trichloromethanesulfenate, in a quantity which is toxic to the bacteria.

References Cited in the file of this patent

UNITED STATES PATENTS 2,553,777   Hawley _____ May 22, 1951

OTHER REFERENCES

Frobisher: Fundamentals of Microbiology, W. B. Saunders Co., 5th ed., 1953, p. 3.

Hackh: Chem. Dictionary, 1944, p. 360, "fungus," The Blackiston Co.